B. O'HARA.
CHURN.
APPLICATION FILED MAR. 17, 1913.
1,077,547.
Patented Nov. 4, 1913.
2 SHEETS—SHEET 2.
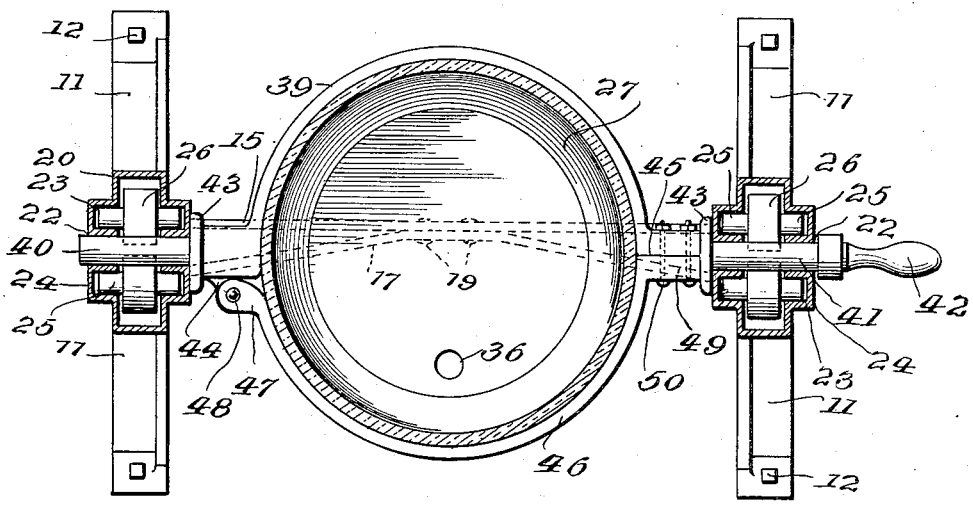
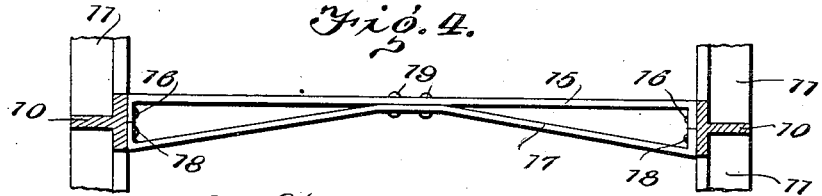
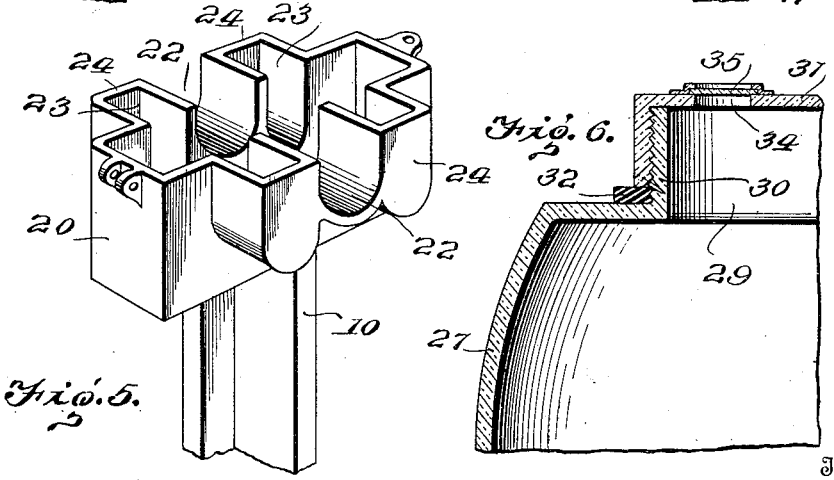
Inventor
B. O'Hara

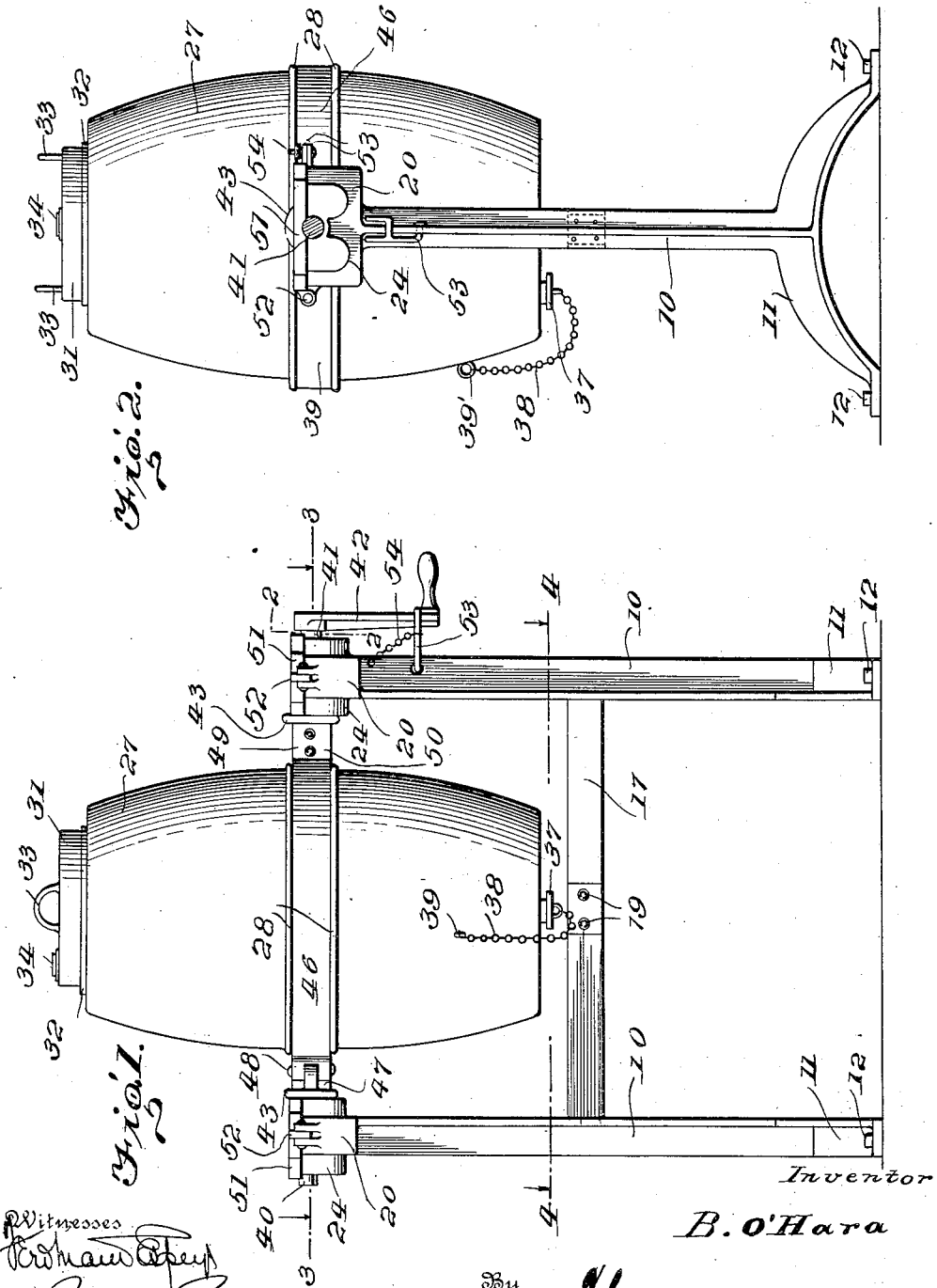

UNITED STATES PATENT OFFICE.

BELZIMERE O'HARA, OF OROFINO, IDAHO.

CHURN.

1,077,547.  Specification of Letters Patent.  Patented Nov. 4, 1913.

Application filed March 17, 1913. Serial No. 754,876.

*To all whom it may concern:*

Be it known that I, BELZIMERE O'HARA, a citizen of the United States, residing at Orofino, in the county of Nez Perce and State of Idaho, have invented certain new and useful Improvements in Churns, of which the following is a specification.

This invention relates to improvements in churns, and has for one of its objects to simplify and improve the construction and increase the efficiency and utility of devices of this character.

Another object of the invention is to provide a simply constructed churn device of the rotating receptacle class and with means for readily disconnecting the receptacle from the supporting frame for cleansing or replacing broken parts.

Another object of the invention is to provide a churn including a cream receptacle having a novel form of closure through which the cream is inserted and the butter removed.

Another object of the invention is to provide an improved form of bearing for the journals of the cream receptacle.

Another object of the invention is to provide a novel means for supporting the cream receptacle upon the frame.

Another object of the invention is to provide a simply constructed frame for supporting the cream receptacle and with means whereby the receptacle for the butter milk may be inserted in position beneath the receptacle.

Another object of the invention is to provide a simply constructed attachment whereby the receptacle may be anchored in position relative to the frame when the cream is being inserted or the butter removed.

With these and other objects in view the invention consists in certain novel features of construction as hereinafter shown and described and then specifically pointed out in the claims, and in the drawings illustrative of the preferred embodiment of the invention.

Figure 1 is a side elevation of the improved churn. Fig. 2 is an end elevation of the same with the crank receiving journal in section on the line 2—2 of Fig. 1. Fig. 3 is an enlarged transverse section on the line 3—3 of Fig. 1. Fig. 4 is a detail in section on the line 4—4 of Fig. 1. Fig. 5 is an enlarged perspective view of the upper portion of one of the bearings. Fig. 6 is an enlarged sectional detail illustrating the manner of constructing and applying the closure to the cream receptacle.

Corresponding and like parts are referred to in the following description and indicated in all the views of the drawings by the same reference characters.

The improved device includes a supporting frame comprising vertical standards 10 spaced apart and provided respectively with lateral "feet" portions 11 to insure the stability of the frame. The feet portions are provided with apertures to receive holding bolts or other fastening devices represented at 12 whereby the frame may be permanently secured to a floor or other support. The standards 10 are connected intermediate their ends by a transverse brace member 15 extending without flexure from end to end and connected to the standards at one side by offsets 16, and another brace member 17 likewise extending between the standards and secured thereby at the opposite side by lateral offsets 18 and deflected centrally to bear against the inner face of the member 15 and riveted thereto, as shown at 19, or otherwise secured. By this means the members 10 are firmly coupled and supported with the central portion of the space between the vertical members formed without obstruction to facilitate the location of butter milk receiving receptacle, as hereafter explained.

Formed upon the upper end of each of the standards 10 is an oil receptacle 20 having centrally disposed transverse bearings 22 open at the ends and likewise provided with transverse bearings 23 located at the sides of the central bearing and closed at the ends as shown at 24. The bearings open into the interior of the oil receptacle 20 and the bottoms of the bearings 23 are below the line of the bottoms of the bearing 22. The bearings 23 are arranged to receive the journals 25 of anti-friction rollers 26, while the bearings 22 are designed to receive the journals of the support for the cream receptacle, as hereafter explained. The rollers 26 are considerably larger than their journals 25 and extend at their lower portions constantly in the oil which is located in the casing 20.

The cream receptacle is represented conventionally at 27 and may be of any required size and of any required form, but is preferably in "barrel" shape as shown and provided with encircling stop ribs 28 spaced apart around the central portion and with a relatively large aperture 29 in one end and surrounded by an externally threaded rim 30, the rim being designed to receive a closure cap 31. A rubber or like packing gasket 32 is located between the lower edge of the cap 31 and the body of the receptacle 29 to insure a cream tight joint. The closure 31 is provided with lifting handles 33 and likewise provided with an observation opening 34 covered by a glass 35. A draw-off aperture 36 is located in the opposite end of the churn and provided with a closure 37, the latter being preferably provided with a chain 38 connected at 39' to the receptacle 27, to prevent the loss of the closure when removed. By this means the butter milk may be readily withdrawn when required.

The support for the receptacle 27 consists of an encircling half band 39 bearing between the stop ribs 28 at one side of the churn and provided with journals 40—41 for engaging in the bearings 22 of the receptacle 20 and in contact with the rollers 26. One of the journals is provided with an operating crank 42. The member 39 is provided with stop flanges 43 to bear against the inner confronting faces of the bearing 22 to prevent lateral movement between the parts. The member 39 is likewise provided with a hinge member 44 at one side and is reduced to form a bearing 45 at the other side. The supporting device likewise includes a half band or semi-circling member 46 bearing around the opposite side of the receptacle 27 and between the stop ribs 28 and provided with an opposing hinge member 47 coupled to the hinge member 44 by a pivot 48. The member 46 is also provided with an outwardly directed bearing 49 which engages against the bearing 45 of the member 39 and is coupled thereto by bolts or other suitable fastening devices 50. By this simple means the receptacle 27 is firmly supported in position to be rotated upon the journals 40—41 when the crank 42 is actuated. The member 27 may be thus firmly clamped in position and rigidly supported during the churning action, while at the same time the member 27 may be readily detached when broken or otherwise impaired and a new receptacle disposed in its place.

When the receptacle is disposed in vertical position, as shown in Figs. 1 and 2, its lower end is spaced a relatively short distance from the braces 15—17, and by laterally deflecting the brace member 17 a space is formed to enable a pail or other receptacle to be disposed beneath the opening 36 to receive the butter milk. A cap or closure 51 is provided for each of the oil receptacles 20, and hinged at one end 52 respectively to the receptacle and provided with lateral projections 53 at the opposite ends to receive a locking bolt or other suitable fastening device 54. By this means the oil receptacle and the anti-friction pulleys are covered and protected.

The receptacle 27 may be of any suitable material such as glass, porcelain, "granite ware", or the like, or it may be of wood as may be preferred.

The improved device is simple in construction, can be inexpensively manufactured and of any required size and capacity.

A catch 53 is connected to one of the standards 10 and adapted to engage the handle 42 and hold the cream receptacle in vertical position while the cream is being supplied thereto and the butter removed, or while the butter milk is being withdrawn, the member 53 being preferably provided with a supporting chain 54 to limit its downward movement.

Having thus described the invention, what is claimed is:

1. In a churn, a supporting frame including bearings spaced apart, a cream receptacle supporting member having journals spaced apart and engaging said frame bearings and engaging the cream receptacle at one side, said supporting member having a hinge member near one of said journals and a seat near the other journal, another cream receptacle supporting member engaging the cream receptacle at the other side, said last-mentioned supporting member being hingedly connected at one end to said hinge member and having bearings at the other end engaging the seat of the first-mentioned receptacle supporting member.

2. In a churn, a support including bearings spaced apart, a cream receptacle supporting member having journals spaced apart and engaging said bearings and with a hinge member near one journal and a seat near the other journal, another cream receptacle supporting member having a hinge member at one end and a seat at the other end for respectively engaging the hinge member and the seat of the first-mentioned cream receptacle supporting member.

In testimony whereof I affix my signature in presence of two witnesses.

BELZIMERE O'HARA. [L. S.]

Witnesses:
EDWARD O'HARA,
ALMA O'HARA.

---

Copies of this patent may be obtained for five cents each, by addressing the "Commissioner of Patents, Washington, D. C."